United States Patent
Park

(10) Patent No.: US 12,313,822 B2
(45) Date of Patent: May 27, 2025

(54) OPTICAL IMAGING SYSTEM

(71) Applicant: Samsung Electro-Mechanics Co., Ltd., Suwon-si (KR)

(72) Inventor: Il Yong Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 457 days.

(21) Appl. No.: 17/715,150

(22) Filed: Apr. 7, 2022

(65) Prior Publication Data

US 2022/0229276 A1    Jul. 21, 2022

Related U.S. Application Data

(63) Continuation of application No. 17/025,490, filed on Sep. 18, 2020, now Pat. No. 11,333,863, which is a continuation of application No. 15/431,112, filed on Feb. 13, 2017, now Pat. No. 10,816,763.

(30) Foreign Application Priority Data

Oct. 12, 2016    (KR) .................. 10-2016-0131910

(51) Int. Cl.
*G02B 13/00*    (2006.01)
*G02B 9/62*    (2006.01)

(52) U.S. Cl.
CPC ............ *G02B 13/0045* (2013.01); *G02B 9/62* (2013.01)

(58) Field of Classification Search
CPC ........ G02B 3/04; G02B 9/62; G02B 13/0045; G02B 13/18

USPC .......................................................... 359/713
See application file for complete search history.

(56) References Cited

U.S. PATENT DOCUMENTS

| | | | |
|---|---|---|---|
| 9,063,318 B2 | 6/2015 | Ishizaka | |
| 9,389,394 B2 | 7/2016 | Park | |
| 9,632,287 B2 | 4/2017 | Chae | |
| 9,804,358 B2 | 10/2017 | Nabeta | |
| 10,054,766 B2 | 8/2018 | Shin et al. | |
| 10,191,248 B2 | 1/2019 | Hashimoto | |
| 10,816,763 B2 | 10/2020 | Park | |
| 2014/0078603 A1 | 3/2014 | You | |
| 2014/0211324 A1 | 7/2014 | Ishizaka | |
| 2015/0029599 A1* | 1/2015 | Huang ............... | G02B 13/0045 359/713 |
| 2015/0049393 A1 | 2/2015 | Park | |

(Continued)

FOREIGN PATENT DOCUMENTS

CN    203673137 A    6/2014
CN    104133283 A    11/2014
(Continued)

OTHER PUBLICATIONS

Chinese Office Action issued on Jun. 1, 2022, in counterpart Chinese Patent Application No. 202110540232.6 (10 pages in English and 8 pages in Chinese).

(Continued)

*Primary Examiner* — Nicholas R. Pasko
(74) *Attorney, Agent, or Firm* — NSIP Law

(57) ABSTRACT

An optical imaging system includes lenses sequentially disposed from an object side toward an imaging plane. A third lens, a fourth lens, and a fifth lens of the lenses each have a negative refractive power. An F number of the optical imaging system is 1.7 or less.

9 Claims, 9 Drawing Sheets

(56) References Cited

U.S. PATENT DOCUMENTS

| | | | |
|---|---|---|---|
| 2015/0055229 A1* | 2/2015 | Park | G02B 13/0045 359/757 |
| 2015/0116843 A1* | 4/2015 | Jo | G02B 9/62 359/713 |
| 2015/0131172 A1* | 5/2015 | Park | G02B 13/0045 359/759 |
| 2015/0146092 A1 | 5/2015 | Chen | |
| 2015/0177483 A1* | 6/2015 | You | G02B 9/62 359/757 |
| 2015/0277083 A1 | 10/2015 | Chae | |
| 2015/0319389 A1 | 11/2015 | Huang | |
| 2015/0370042 A1 | 12/2015 | Chen et al. | |
| 2016/0041370 A1 | 1/2016 | Lee et al. | |
| 2016/0054543 A1 | 2/2016 | Nabeta | |
| 2016/0116715 A1 | 4/2016 | Ota | |
| 2016/0124191 A1 | 5/2016 | Hashimoto | |
| 2016/0139366 A1 | 5/2016 | Jung | |
| 2016/0139368 A1 | 5/2016 | You | |
| 2016/0161713 A1 | 6/2016 | Huang | |
| 2016/0187619 A1 | 6/2016 | Tang et al. | |
| 2016/0187621 A1 | 6/2016 | Chen | |
| 2016/0259150 A1 | 9/2016 | Shin et al. | |
| 2018/0059374 A1 | 3/2018 | Chen et al. | |

FOREIGN PATENT DOCUMENTS

| | | |
|---|---|---|
| CN | 104375259 A | 2/2015 |
| CN | 105022140 A | 11/2015 |
| CN | 204832662 A | 12/2015 |
| CN | 105607222 A | 5/2016 |
| CN | 105607224 A | 5/2016 |
| KR | 10-2015-0019804 A | 2/2015 |
| KR | 10-2015-0112544 A | 10/2015 |
| KR | 10-2016-0108080 A | 9/2016 |
| WO | WO 2014/162779 A1 | 10/2014 |

OTHER PUBLICATIONS

Fischer, Robert Edward, et al., Optical System Design, 2000, Chinese translation published by Editorial Office of Infrared and Laser Engineering, Mar. 2004, pp. 240-260 (28 pages in English, 21 pages in Chinese).

Chinese Office Action issued on Oct. 9, 2019 in counterpart Chinese Patent Application No. 201710230241.9 (9 pages in English, 7 pages in Chinese).

Chinese Office Action issued on May 26, 2020, in counterpart Chinese Patent Application No. 201710230241.9 (9 pages in English, 7 pages in Chinese).

U.S. Appl. No. 15/431,112, filed Feb. 3, 2017, Il Yong Park, Samsung Electro-Mechanics, Co., Ltd.

Korean Office Action Issued on Mar. 6, 2024, in Counterpart Korean Patent Application No. 10-2016-0131910 (7 Pages in English, 5 Pages in Korean).

Korean Office Action issued on Nov. 20, 2024, in counterpart Korean Patent Application No. 10-2016-0131910 (5 pages in English, 5 pages in Korean).

* cited by examiner

| FIRST EXAMPLE | S1 | S2 | S3 | S4 | S5 | S6 | S7 | S8 | S9 | S10 | S11 | S12 |
|---|---|---|---|---|---|---|---|---|---|---|---|---|
| RADIUS OF CURVATURE | 2.284 | 4.861 | 3.137 | -9.574 | 8.185 | 2.807 | -62.589 | 105.175 | 6.332 | 5.086 | 1.948 | 1.433 |
| CONIC CONSTANT(K) | -1.790 | -21.297 | -2.111 | -5.295 | 44.529 | -6.855 | 0.000 | 0.000 | 0.000 | -36.088 | -6.636 | -5.188 |
| 4TH-ORDER COEFFICIENT(A) | -0.014 | -0.062 | -0.042 | -0.049 | -0.074 | 0.008 | -0.073 | -0.072 | 0.023 | -0.084 | -0.346 | -0.143 |
| 6TH-ORDER COEFFICIENT(B) | -0.012 | -0.028 | -0.007 | 0.010 | 0.049 | 0.036 | -0.020 | -0.157 | -0.216 | 0.149 | 0.286 | 0.083 |
| 8TH-ORDER COEFFICIENT(C) | -0.012 | 0.019 | -0.019 | 0.048 | 0.030 | -0.012 | 0.070 | 0.384 | 0.342 | -0.171 | -0.165 | -0.038 |
| 10TH-ORDER COEFFICIENT(D) | 0.014 | 0.024 | 0.111 | -0.087 | -0.136 | -0.009 | 0.053 | -0.489 | -0.446 | 0.105 | 0.061 | 0.012 |
| 12TH-ORDER COEFFICIENT(E) | -0.014 | -0.031 | -0.109 | 0.074 | 0.133 | -0.006 | -0.297 | 0.405 | 0.391 | -0.039 | -0.014 | -0.002 |
| 14TH-ORDER COEFFICIENT(F) | 0.008 | 0.014 | 0.046 | -0.031 | -0.057 | 0.024 | 0.362 | -0.222 | -0.218 | 0.009 | 0.002 | 0.000 |
| 16TH-ORDER COEFFICIENT(G) | -0.002 | -0.003 | -0.008 | 0.005 | 0.008 | -0.008 | -0.189 | 0.083 | 0.073 | -0.001 | 0.000 | 0.000 |
| 18TH-ORDER COEFFICIENT(H) | 0.000 | 0.000 | 0.000 | 0.000 | 0.000 | 0.000 | 0.035 | -0.020 | -0.013 | 0.000 | 0.000 | 0.000 |
| 20TH-ORDER COEFFICIENT(J) | 0.000 | 0.000 | 0.000 | 0.000 | 0.000 | 0.000 | 0.000 | 0.002 | 0.001 | 0.000 | 0.000 | 0.000 |

FIG. 3

| SECOND EXAMPLE | S1 | S2 | S3 | S4 | S5 | S6 | S7 | S8 | S9 | S10 | S11 | S12 |
|---|---|---|---|---|---|---|---|---|---|---|---|---|
| RADIUS OF CURVATURE | 2.194 | 5.274 | 3.668 | -8.855 | 7.954 | 2.787 | -5179.9 | 60.995 | 9.710 | 7.307 | 1.980 | 1.370 |
| CONIC CONSTANT(K) | -1.300 | -12.740 | -2.659 | -5.295 | 43.859 | -7.461 | 0.000 | 0.000 | 0.000 | -36.088 | -6.743 | -5.730 |
| 4TH-ORDER COEFFICIENT(A) | -0.011 | -0.055 | -0.038 | -0.047 | -0.070 | 0.008 | -0.051 | -0.028 | 0.064 | -0.076 | -0.357 | -0.138 |
| 6TH-ORDER COEFFICIENT(B) | -0.004 | -0.016 | -0.008 | -0.005 | 0.040 | 0.025 | -0.048 | -0.163 | -0.227 | 0.146 | 0.300 | 0.079 |
| 8TH-ORDER COEFFICIENT(C) | -0.027 | -0.003 | -0.021 | 0.088 | 0.043 | 0.005 | 0.119 | 0.307 | 0.298 | -0.174 | -0.176 | -0.036 |
| 10TH-ORDER COEFFICIENT(D) | 0.038 | 0.047 | 0.109 | -0.153 | -0.131 | -0.020 | -0.074 | -0.318 | -0.344 | 0.108 | 0.067 | 0.012 |
| 12TH-ORDER COEFFICIENT(E) | -0.034 | -0.049 | -0.107 | 0.125 | 0.093 | -0.009 | -0.059 | 0.208 | 0.279 | -0.041 | -0.015 | -0.002 |
| 14TH-ORDER COEFFICIENT(F) | 0.016 | 0.023 | 0.047 | -0.050 | -0.011 | 0.028 | 0.108 | -0.083 | -0.147 | 0.009 | 0.002 | 0.000 |
| 16TH-ORDER COEFFICIENT(G) | -0.003 | -0.004 | -0.008 | 0.008 | -0.007 | -0.009 | -0.053 | 0.020 | 0.047 | -0.001 | 0.000 | 0.000 |
| 18TH-ORDER COEFFICIENT(H) | 0.000 | 0.000 | 0.000 | 0.000 | 0.000 | 0.000 | 0.007 | -0.003 | -0.008 | 0.000 | 0.000 | 0.000 |
| 20TH-ORDER COEFFICIENT(J) | 0.000 | 0.000 | 0.000 | 0.000 | 0.000 | 0.000 | 0.000 | 0.000 | 0.001 | 0.000 | 0.000 | 0.000 |

FIG. 6

| THIRD EXAMPLE | S1 | S2 | S3 | S4 | S5 | S6 | S7 | S8 | S9 | S10 | S11 | S12 |
|---|---|---|---|---|---|---|---|---|---|---|---|---|
| RADIUS OF CURVATURE | 2.274 | 5.141 | 3.393 | -8.793 | 8.093 | 2.857 | -48.616 | 553.590 | 6.819 | 5.422 | 2.036 | 1.424 |
| CONIC CONSTANT(K) | -1.602 | -18.015 | -2.308 | -5.295 | 44.197 | -7.478 | 0.000 | 0.000 | 0.000 | -36.088 | -6.244 | -5.687 |
| 4TH-ORDER COEFFICIENT(A) | -0.013 | -0.060 | -0.039 | -0.050 | -0.075 | 0.005 | -0.065 | -0.068 | 0.007 | -0.083 | -0.357 | -0.138 |
| 6TH-ORDER COEFFICIENT(B) | -0.009 | -0.023 | -0.009 | 0.014 | 0.059 | 0.041 | 0.003 | -0.117 | -0.194 | 0.140 | 0.303 | 0.079 |
| 8TH-ORDER COEFFICIENT(C) | -0.017 | 0.008 | -0.017 | 0.030 | -0.007 | -0.022 | 0.015 | 0.306 | 0.324 | -0.159 | -0.179 | -0.035 |
| 10TH-ORDER COEFFICIENT(D) | 0.021 | 0.036 | 0.101 | -0.063 | -0.071 | -0.002 | 0.110 | -0.413 | -0.448 | 0.098 | 0.068 | 0.010 |
| 12TH-ORDER COEFFICIENT(E) | -0.020 | -0.039 | -0.095 | 0.056 | 0.072 | -0.001 | -0.320 | 0.375 | 0.415 | -0.036 | -0.016 | -0.002 |
| 14TH-ORDER COEFFICIENT(F) | 0.010 | 0.018 | 0.038 | -0.024 | -0.020 | 0.014 | 0.354 | -0.232 | -0.243 | 0.008 | 0.002 | 0.000 |
| 16TH-ORDER COEFFICIENT(G) | -0.002 | -0.003 | -0.006 | 0.004 | -0.001 | -0.005 | -0.182 | 0.096 | 0.085 | -0.001 | 0.000 | 0.000 |
| 18TH-ORDER COEFFICIENT(H) | 0.000 | 0.000 | 0.000 | 0.000 | 0.000 | 0.000 | 0.035 | -0.024 | -0.016 | 0.000 | 0.000 | 0.000 |
| 20TH-ORDER COEFFICIENT(J) | 0.000 | 0.000 | 0.000 | 0.000 | 0.000 | 0.000 | 0.000 | 0.003 | 0.001 | 0.000 | 0.000 | 0.000 |

FIG. 9

OPTICAL IMAGING SYSTEM

CROSS-REFERENCE TO RELATED APPLICATIONS

This application is a continuation of application Ser. No. 17/025,490 filed on Sep. 18, 2020, now U.S. Pat. No. 11,833,863 issued on May 17, 2022, which is a continuation of U.S. patent application Ser. No. 15/431, 112 filed on Feb. 13, 2017, now U.S. Pat. No. 10,816,763 issued on Oct. 27, 2020, which claims the benefit under 35 USC 119 (a) of Korean Patent Application No. 10-2016-0131910 filed on Oct. 12, 2016, in the Korean Intellectual Property Office, the entire disclosures of which are incorporated herein by reference for all purposes.

BACKGROUND

1. Field

The following description relates to an optical imaging system including six lenses.

2. Description of Related Art

A small camera module can be mounted on a portable terminal. For example, a small camera module may be mounted on a device having a thin width, such as a mobile phone. A small camera module may include an optical imaging system that is likewise improved by a reduced width, which includes a small number of lenses. For example, a small camera module may have an optical imaging system including four to six lenses.

However, there may be limitations for an optical imaging system having a small number of lenses used to implement a high-resolution camera module. Likewise, the ability to reduce the width of an optical imaging system including a large number of lenses is limited. Therefore, the development of an optical imaging system capable of simultaneously implementing high resolution with a thin-width camera module is sought.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes lenses that are sequentially disposed from an object side toward an imaging plane. A third lens, a fourth lens, and a fifth lens of the lenses have each have a negative refractive power. An F number of the optical imaging system is 1.7 or less.

An object-side surface of the third lens may be convex along an optical axis of the optical imaging system and an image-side surface of the third lens may be concave along the optical axis. Both surfaces of the fourth lens can be concave along an optical axis of the optical imaging system. An object-side surface of the fifth lens may be convex along an optical axis of the optical imaging system and an image-side surface fifth lens may be concave along the optical axis. A sixth lens can be disposed between the fifth lens and the imaging plane.

In another general aspect, an optical imaging system includes: a first lens having a positive refractive power; a second lens having a positive refractive power; a third lens having a negative refractive power; a fourth lens having a negative refractive power; a fifth lens having a negative refractive power; and a sixth lens having a negative refractive power. The first lens to the sixth lens are respectively disposed from an object side toward an imaging plane.

An object-side surface of the first lens can be convex along an optical axis of the optical imaging system and an image-side surface of the first lens can be concave along the optical axis. Both surfaces of the second lens may be convex along an optical axis of the optical imaging system. An object-side surface of the third lens can be convex along an optical axis of the optical imaging system and an image-side surface of the third lens can be concave along the optical axis.

Both surfaces of the fourth lens can be concave along an optical axis of the optical imaging system. An object-side surface of the fifth lens may be convex along an optical axis of the optical imaging system and an image-side surface of the fifth lens may be concave along the optical axis. An object-side surface of the sixth lens can be convex along an optical axis of the optical imaging system and an image-side surface of the sixth lens can be concave.

The fifth lens may have an inflection point formed on an object-side surface or an image-side surface. The sixth lens can have an inflection point formed on an object-side surface or an image-side surface.

The optical imaging system can have an F number of 1.7 or less. The optical imaging system can satisfy one or any combination of the conditional expressions: $1.0 < f1/f < 2.0$, $0.5 < f2/f < 2.0$, or $-2.0 < f3/f < -1.0$, where f represents an overall focal length of the optical imaging system, f1 represents a focal length of the first lens, f2 represents a focal length of the second lens, and f3 represents a focal length of the third lens.

In another general aspect, an optical imaging system includes a first lens having a convex object-side surface, a second lens having a convex object-side surface, a third lens having a convex object-side surface, a fourth lens having a concave object-side surface and a concave image-side surface, a fifth lens having a convex object-side surface, and a sixth lens having a convex object-side surface.

The optical imaging system can satisfy the conditional expression $0.9 < f1/f2 < 2.0$, where f1 represents a focal length of the first lens and f2 represents a focal length of the second lens. The optical imaging system may satisfy the conditional expression $-1.2 < f2/f3 < -0.3$, where f2 represents a focal length of the second lens and f3 represents a focal length of the third lens. The optical imaging system may also satisfy one or any combination of the conditional expressions $0.3 < R1/f$, $0.7 < R5/f$, or $10 < R8/f$, where R1 represents a radius of curvature of an object-side surface of the first lens, R5 represents a radius of curvature of an object-side surface of the third lens, R8 represents a radius of curvature of an image-side surface of the fourth lens. Other features and aspects will be apparent from the following detailed description, the drawings, and the claims.

BRIEF DESCRIPTION OF DRAWINGS

FIG. 3 is a table listing aspherical characteristics of the optical imaging system illustrated in FIG. 1.

FIG. 6 is a table listing aspherical characteristics of the optical imaging system illustrated in FIG. 4.

FIG. 9 is a table listing aspherical characteristics of the optical imaging system illustrated in FIG. 7.

Figure 1:
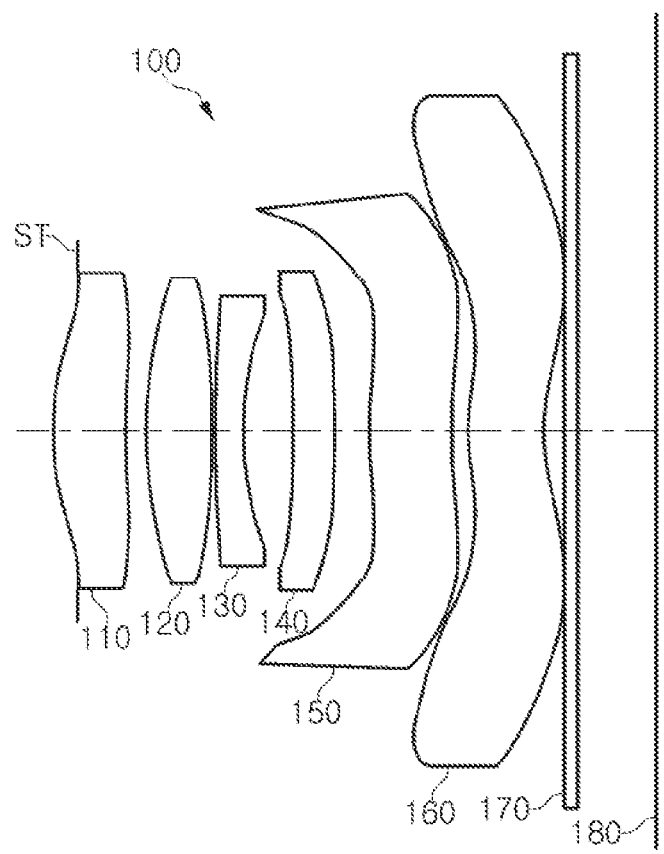
FIG. 1 is a view of an optical imaging system, according to a first example.

Throughout the drawings and the detailed description, the same reference numerals refer to the same elements where applicable. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of functions and constructions that are well known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various components, regions, or sections, these components, regions, or sections are not to be limited by these terms. Rather, these terms are only used to distinguish one component, region, or section from another component, region, or section. Thus, a first component, region, or section referred to in examples described herein may also be referred to as a second component, region, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Examples provide an optical imaging system having high resolution. Hereinafter, examples are described in further detail with reference to the accompanying drawings.

In accordance with an example, a first lens refers to a lens closest to an object or a subject from which an image is captured. A sixth lens is a lens closest to an imaging plane or an image sensor. In an embodiment, all radii of curvature of lenses, thicknesses, distances from an object-side surface of the first lens to an imaging plane (TTL), half diagonal lengths of the imaging plane (IMG HT), and focal lengths of each lens are indicated in millimeters (mm). A person skilled in the relevant art will appreciate that other units of measurement may be used. Further, in embodiments, all radii of curvature, thicknesses, OALs (optical axis distances from the first surface of the first lens to the image sensor), a distance on the optical axis between the stop and the image sensor (SLs), image heights (IMGHs) (image heights), and back focus lengths (BFLs) of the lenses, an overall focal length of an optical system, and a focal length of each lens are indicated in millimeters (mm). Further, thicknesses of lenses, gaps between the lenses, OALs, TLs, SLs are distances measured based on an optical axis of the lenses.

A surface of a lens being convex means that an optical axis portion of a corresponding surface is convex, and a surface of a lens being concave means that an optical axis portion of a corresponding surface is concave. Therefore, in a configuration in which one surface of a lens is described as being convex, an edge portion of the lens may be concave. Likewise, in a configuration in which one surface of a lens is described as being concave, an edge portion of the lens may be convex. In other words, a paraxial region of a lens may be convex, while the remaining portion of the lens outside the paraxial region is either convex, concave, or flat. Further, a paraxial region of a lens may be concave, while the remaining portion of the lens outside the paraxial region is either convex, concave, or flat. In addition, in an embodiment, thicknesses and radii of curvatures of lenses are measured in relation to optical axes of the corresponding lenses.

In accordance with illustrative examples, the embodiments described of the optical system include six lenses with a refractive power. However, the number of lenses in the optical system may vary, for example, between two to six lenses, while achieving the various results and benefits described below. Also, although each lens is described with a particular refractive power, a different refractive power for at least one of the lenses may be used to achieve the intended result.

An optical imaging system includes six lenses. For example, the optical imaging system may include a first lens, a second lens, a third lens, a fourth lens, a fifth lens, a sixth lens, sequentially disposed from an object side.

The first lens has a refractive power. In an example, the first lens has a positive refractive power. At least one surface of the first lens is convex. For example, an object-side surface of the first lens is convex.

The first lens may have an aspherical surface. In an embodiment, both surfaces of the first lens are aspherical. The first lens is formed of a material having a high degree of light transmissivity and excellent workability. For example, the first lens is formed of a plastic material. However, a material of the first lens is not limited to being a plastic material. In another example, the first lens may be formed of a glass material. The first lens may have a low refractive index. For example, the refractive index of the first lens is lower than 1.6.

The second lens has a refractive power. In an example, the second lens has a positive refractive power. One surface of the second lens is convex. For example, an object-side surface of the second lens is convex.

The second lens has an aspherical surface. In an embodiment, an object-side surface of the second lens is aspherical. The second lens is formed of a material having a high degree of light transmissivity and excellent workability. For example, the second lens is formed of a plastic material. However, a material of the second lens is not limited to being plastic. In another example, the second lens may be formed of a glass material. The second lens may have a refractive index substantially the same as that of the first lens. For example, the refractive index of the second lens is lower than 1.6.

The third lens has a refractive power. In an example, the third lens has a negative refractive power. At least one surface of the third lens is convex. As an example, an object-side surface of the third lens is convex.

The third lens has an aspherical surface. In embodiments, an image-side surface of the third lens is aspherical. The third lens is formed of a material having a high degree of light transmissivity and excellent workability. For example, the third lens is formed of a plastic material. However, a material of the third lens is not limited to being plastic. In another example, the third lens may be formed of a glass material. The third lens has a refractive index higher than that of the first lens. In an embodiment, the refractive index of the third lens is 1.6 or more.

The fourth lens has a refractive power. As an example, the fourth lens has a negative refractive power. At least one surface of the fourth lens is concave. In an embodiment, both surfaces of the fourth lens are concave.

The fourth lens has an aspherical surface. In an example, both surfaces of the fourth lens are aspherical. The fourth lens is formed of a material having a high degree of light transmissivity and excellent workability. For example, the fourth lens is formed of a plastic material. However, a material of the fourth lens is not limited to being plastic. In another example, the fourth lens may be formed of a glass material. The fourth lens has a refractive index higher than that of the first lens. In an embodiment, the refractive index of the fourth lens is 1.6 or more.

The fifth lens has a refractive power. In an example, the fifth lens has a negative refractive power. One surface of the fifth lens is convex. For instance, an object-side surface of the fifth lens is convex. The fifth lens has an inflection point. In an embodiment, an object-side surface or an image-side surface of the fifth lens has one or more inflection points.

The fifth lens includes an aspherical surface. As an example, both surfaces of the fifth lens are aspherical. The fifth lens is formed of a material having a high degree of light transmissivity and excellent workability. For example, the fifth lens is formed of a plastic material. However, a material of the fifth lens is not limited to being plastic. In another example, the fifth lens may be formed of a glass material. The fifth lens has a refractive index higher than that of the first lens. In an embodiment, the refractive index of the fifth lens is 1.6 or more.

The sixth lens has a refractive power. In an example, the sixth lens has a negative refractive power. At least one surface of the sixth lens is convex. As an example, an object-side surface of the sixth lens is convex. The sixth lens has an inflection point. In some embodiments, an object-side surface or an image-side surface of the sixth lens has one or more inflection points.

The sixth lens has an aspherical surface. For example, both surfaces of the sixth lens are aspherical. The sixth lens is formed of a material having a high degree of light transmissivity and excellent workability. As an example, the sixth lens is formed of a plastic material. However, a material of the sixth lens is not limited to being plastic. In another example, the sixth lens may be formed of a glass material. The sixth lens may have a refractive index substantially the same as that of the first lens. In an embodiment, the refractive index of the sixth lens is lower than 1.6.

Aspherical surfaces of each of the first lens to the sixth lens may be represented by Equation 1.

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20} \quad (1)$$

In Equation 1, c represents an inverse of a radius of curvature of the lens, k represents a conic constant, r represents a distance from a certain point on an aspherical surface of the lens to an optical axis, A to J represent aspherical constants, and Z (or SAG) represents a distance between the certain point on the aspherical surface of the lens at the distance r and a tangential plane meeting the apex of the aspherical surface of the lens.

The optical imaging system may further include a filter, an image sensor, and a stop. The filter may be disposed between the sixth lens and the image sensor. The filter may block certain wavelengths of light to obtain a clear image. For example, the filter blocks infrared wavelengths of light. The image sensor may form an imaging plane. In an embodiment, a surface of the image sensor forms an imaging plane. The stop may be disposed to adjust an amount of light incident on a lens. As an example, the stop is disposed in front of the first lens.

The optical imaging system satisfies any one or any combination any two or more of the following Conditional Expressions:

| | |
|---|---|
| $1.0 < f1/f < 2.0$ | (Conditional Expression 1) |
| $0.5 < f2/f < 2.0$ | (Conditional Expression 2) |
| $2.0 < f3/f < -1.0$ | (Conditional Expression 3) |
| $f4/f < 0$ | (Conditional Expression 4) |
| $f5/f < 0$ | (Conditional Expression 5) |
| $f6/f < 0$ | (Conditional Expression 6) |
| $V1-V2 < 10$ | (Conditional Expression 7) |
| $30 < V1-V3 < 40$ | (Conditional Expression 8) |
| $30 < V1-V5 < 40$ | (Conditional Expression 9) |

| | |
|---|---|
| $TTL/f<1.3$ | (Conditional Expression 10) |
| $TTL/f12<1.9$ | (Conditional Expression 11) |
| $f13/EPD<1.7$ | (Conditional Expression 12) |
| $0.9<f1/f2<2.0$ | (Conditional Expression 13) |
| $-1.2<f2/f3<-0.3$ | (Conditional Expression 14) |
| $0.15<BFL/f$ | (Conditional Expression 15) |
| $D12/f<0.08$ | (Conditional Expression 16) |
| $0.3<R1/f$ | (Conditional Expression 17) |
| $0.7<R5/f$ | (Conditional Expression 18) |
| $10<R8/f$ | (Conditional Expression 19) |
| $75°<FOV$ | (Conditional Expression 20) |
| $F\ No. \leq 1.7$ | (Conditional Expression 21) |

In the Conditional Expressions, f represents an overall focal length of the optical imaging system, f1 represents a focal length of the first lens, f2 represents a focal length of the second lens, f3 represents a focal length of the third lens, f4 represents a focal length of the fourth lens, f5 represents a focal length of a fifth lens, and f6 represents a focal length of a sixth lens. Furthermore, in Conditional Expressions 7 through 9, V1 represents an Abbe number of the first lens, V2 represents an Abbe number of the second lens, V3 represents an Abbe number of the third lens, and V5 represents an Abbe number of a fifth lens. In Conditional Expressions 10 through 16, TTL represents a distance from an object-side surface of the first lens to an imaging plane, f12 represents a composite focal length of the first lens and the second lens, f13 represents a composite focal length of the first lens to the third lens, BFL represents a distance from an image-side surface of a sixth lens to an imaging plane, and D12 represents a distance from an image-side surface of the first lens to an object-side surface of the second lens. In Conditional Expressions 17 through 20, R1 represents a radius of curvature of an object-side surface of the first lens, R5 represents a radius of curvature of an object-side surface of the third lens, R8 represents a radius of curvature of an image-side surface of the fourth lens, FOV represents an angle of view of the optical imaging system, and EPD represents entrance pupil diameter of the optical imaging system.

Conditional Expression 1 is an equation to provide parameters of the first lens for optical imaging systems. As an example, in cases outside of the numerical range of Conditional Expression 1, the first lens may have significantly high or low refractive power, and overall optical performance of the optical imaging system may decrease.

Conditional Expression 2 is an equation to provide parameters of the second lens for optical imaging systems. For example, in a case in which the second lens has significantly high or low refractive power, outside of the numerical range of Conditional Expression 2, it may be difficult to perform aberration correction for the optical imaging system.

Conditional Expressions 3 to 6 are equations to calibrate the refractive power of the third lens to the sixth lens for optical imaging systems. For example, in cases in which the third lens to the sixth lens are outside of the numerical ranges of Conditional Expressions 3 to 6, the third lens to the sixth lens may be limited to having a negative refractive power.

Conditional Expressions 7 through 9 are equations to provide parameters for significantly reducing chromatic aberration. Conditional Expressions 10 and 11 are equations to reduce the size of the optical imaging system. For example, in a case in which the optical imaging system is outside of the numerical range of Conditional Expressions 10 or 11, it may be difficult to miniaturize the optical imaging system.

Conditional Expression 12 is an equation to allow for the imaging of a bright image. As an example, in a case in which the optical imaging system is outside of the numerical range of Conditional Expression 12, the optical imaging system may be limited to having an F number of 1.7 or less.

Conditional Expression 13 is an equation for a refractive power ratio between the first lens and the second lens that improves aberration characteristics. For example, in a case in which the first lens and the second lens are outside of the numerical range of Conditional Expression 13, one of the first lens and the second lens may have a significantly high relative refractive power. Thus, aberration characteristics of the optical imaging system may be decreased and optical performance may be decreased.

Conditional Expression 14 is an equation for a refractive power ratio between the second lens and the third lens that improves aberration characteristics. For example, in a case in which the second lens and the third lens are outside of the numerical range of Conditional Expression 14, one of the second lens and the third lens may have a significantly high relative refractive power. Thus, aberration characteristics of the optical imaging system may be decreased and overall optical performance may also be decreased.

Conditional Expression 15 is an equation for miniaturization of the optical imaging system. For example, in cases in which optical imaging systems are outside of an upper limit value of Conditional Expression 15, it may be difficult to miniaturize the optical imaging system.

Conditional Expression 16 is an equation for improving longitudinal chromatic aberration characteristics of an optical imaging system. For instance, in a case in which the optical imaging system is outside of the numerical range of Conditional Expression 16, it may be difficult to improve longitudinal chromatic aberration characteristics.

Conditional Expressions 17 through 19 are equations for limiting magnitudes of the refractive power of the first lens, the third lens, or the fourth lens, respectively. For example, cases in which the first lens, the third lens, or the fourth lens are outside of the numerical range of Conditional Expression 17 through 19, performance of the optical imaging system may be decreased.

Next, optical imaging systems, according to several examples, will be described. An optical imaging system, according to a first example, will be described with reference to FIG. 1. An optical imaging system 100, according to the first example, includes an optical system including a first lens 110, a second lens 120, a third lens 130, a fourth lens 140, a fifth lens 150, and a sixth lens 160.

The first lens 110 has a positive refractive power. An object-side surface of lens 110 is convex and an image-side surface of lens 110 is concave. The second lens 120 has a positive refractive power. Both surfaces of lens 120 are convex. The third lens 130 has a negative refractive power. An object-side surface of lens 130 is convex, and an image-side surface of lens 130 is concave.

The fourth lens 140 has a negative refractive power. Both surfaces of lens 140 are concave. The fifth lens 150 has a negative refractive power. An object-side surface of lens 150 is convex and an image-side surface of lens 150 is concave. In addition, fifth lens 150 has an inflection point formed on an object-side surface or an image-side surface. The sixth lens 160 has a negative refractive power. An object-side surface of lens 160 is convex. An image-side surface of lens 160 is concave. In addition, sixth lens 160 has an inflection point formed on an object-side surface or an image-side surface.

According to the example, optical imaging system 100 may further include a filter 170, an image sensor 180, and a stop ST. The filter 170 is disposed between the sixth lens 160 and the image sensor 180, and the stop ST is disposed in an object-side surface of the first lens 110.

Figure 2:
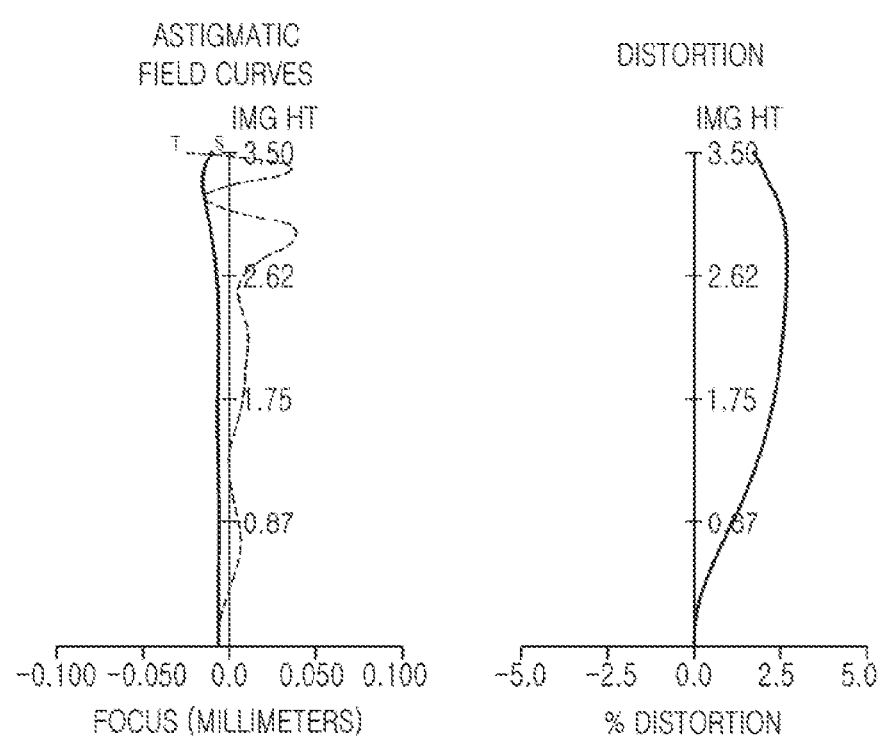
FIG. 2 is a set of graphs illustrating aberration curves of the optical imaging system illustrated in FIG. 1.

In the optical imaging system 100, f12 is 2.985 mm, and f13 is 4.360 mm. The optical imaging system, configured as described above, represents aberration characteristics as illustrated in the graphs of FIG. 2. FIG. 3 represents aspherical characteristics of the optical imaging system, according to the first example. Characteristics of lenses of the optical imaging system 100, according to the first example, are listed in Table 1.

surface of lens 210 is concave. The second lens 220 has a positive refractive power. Both surfaces of lens 220 are convex. The third lens 230 has a negative refractive power. An object-side surface of lens 230 is convex and an image-side surface of lens 230 is concave.

The fourth lens 240 has a negative refractive power. Both surfaces of lens 240 are be concave. The fifth lens 250 has a negative refractive power. An object-side surface of lens 250 is convex and an image-side surface of lens 250 is concave. In addition, fifth lens 250 has an inflection point formed on an object-side surface or an image-side surface. The sixth lens 260 has a negative refractive power. An object-side surface of lens 260 is convex and an image-side surface of lens 260 is concave. Moreover, sixth lens 260 has an inflection point formed on an object-side surface or an image-side surface.

The optical imaging system 200 includes a filter 270, an image sensor 280, and a stop ST. The filter 270 is disposed between the sixth lens 260 and the image sensor 280, while the stop ST may be disposed in an object-side surface of first lens 210.

TABLE 1

First Example
F No. = 1.60 FOV = 78.2° f = 4.230 TTL = 5.168

| Surface No. | Element | Radius of Curvature | Thickness/ Distance | Refractive Index | Abbe Number | Focal Length |
|---|---|---|---|---|---|---|
| S0 | Stop | Infinity | −0.2100 | | | |
| S1 | First | 2.2842 | 0.6223 | 1.547 | 56.10 | 7.265 |
| S2 | Lens | 4.8609 | 0.1742 | | | |
| S3 | Second | 3.1371 | 0.5706 | 1.547 | 56.10 | 4.393 |
| S4 | Lens | −9.5742 | 0.0200 | | | |
| S5 | Third | 8.1852 | 0.2500 | 1.669 | 20.40 | −6.511 |
| S6 | Lens | 2.8072 | 0.4140 | | | |
| S7 | Fourth | −62.5895 | 0.3576 | 1.669 | 20.40 | −58.628 |
| S8 | Lens | 105.1747 | 0.3110 | | | |
| S9 | Fifth | 6.3323 | 0.7065 | 1.669 | 20.40 | −50.000 |
| S10 | Lens | 5.0860 | 0.1407 | | | |
| S11 | Sixth | 1.9476 | 0.6381 | 1.537 | 55.70 | −17.828 |
| S12 | Lens | 1.4331 | 0.1833 | | | |
| S13 | Filter | Infinity | 0.1100 | 1.519 | 64.20 | |
| S14 | | Infinity | 0.1000 | | | |
| S15 | Imaging Plane | Infinity | 0.5700 | | | |

Figure 4:
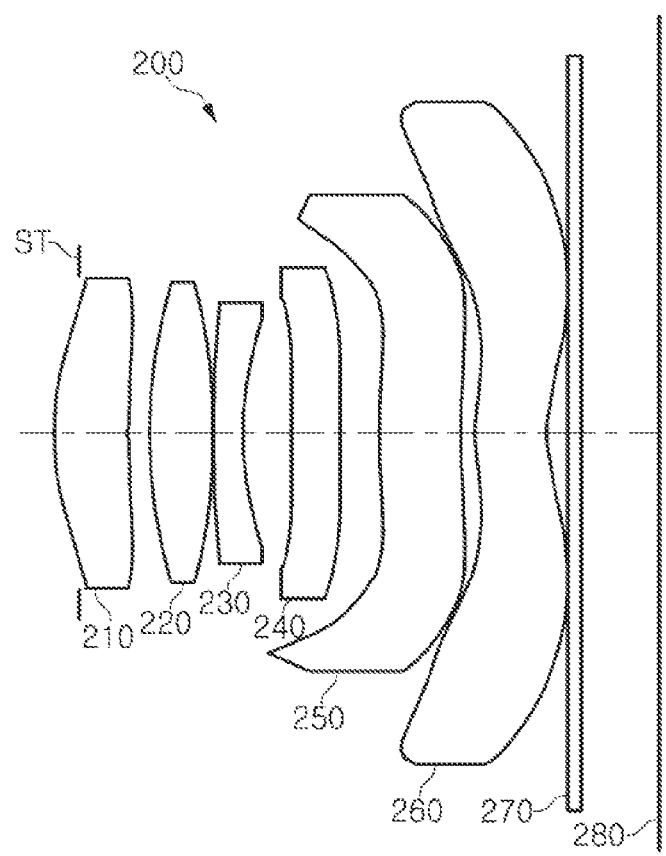
FIG. 4 is a view of an optical imaging system, according to a second example.

With reference to FIG. 4, an optical imaging system, according to a second example, will be described. An optical imaging system 200, according to the second example, includes an optical system including a first lens 210, a second lens 220, a third lens 230, a fourth lens 240, a fifth lens 250, and a sixth lens 260.

Figure 5:
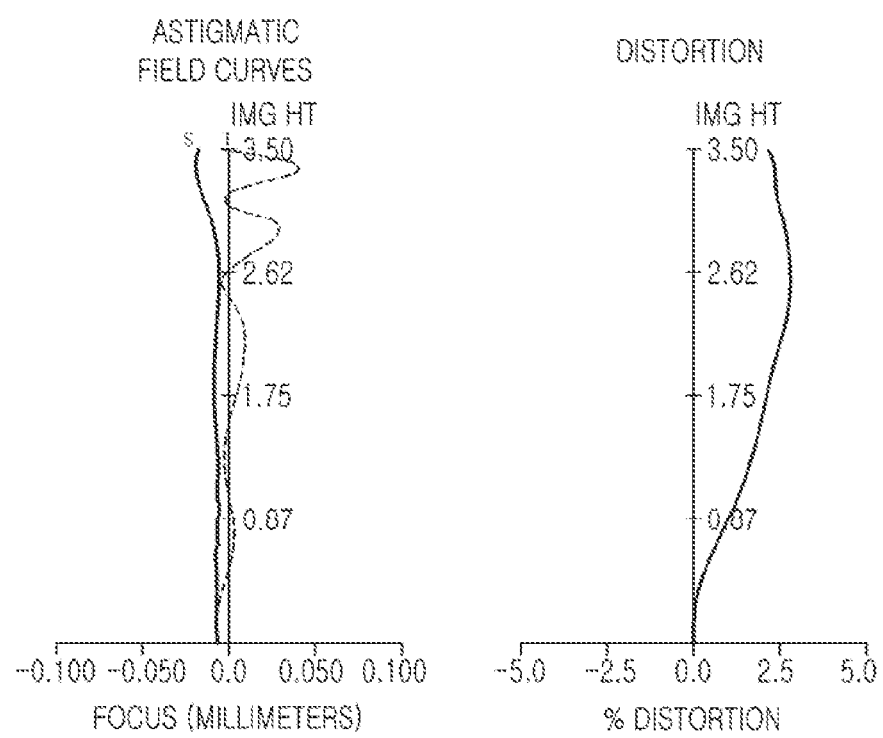
FIG. 5 is a set of graphs illustrating aberration curves of the optical imaging system illustrated in FIG. 4.

The first lens 210 has a positive refractive power. An object-side surface of lens 210 is convex and an image-side In optical imaging system 200, f12 is 3.005 mm and f13 is 4.380 mm. The optical imaging system, configured as described above, represents aberration characteristics as illustrated in the graphs of FIG. 5. FIG. 6 represents aspherical characteristics of the optical imaging system, according to the second example. Characteristics of lenses of the optical imaging system 200, according to the second example, are listed in Table 2.

TABLE 2

Second Example
F No. = 1.65 FOV = 76.4° f = 4.350 TTL = 5.229

| Surface No. | Element | Radius of Curvature | Thickness/ Distance | Refractive Index | Abbe Number | Focal Length |
|---|---|---|---|---|---|---|
| S0 | Stop | Infinity | −0.2100 | | | |
| S1 | First | 2.1945 | 0.6404 | 1.547 | 56.10 | 6.406 |
| S2 | Lens | 5.2739 | 0.1862 | | | |
| S3 | Second | 3.6685 | 0.5365 | 1.547 | 56.10 | 4.819 |

TABLE 2-continued

Second Example
F No. = 1.65 FOV = 76.4° f = 4.350 TTL = 5.229

| Surface No. | Element | Radius of Curvature | Thickness/ Distance | Refractive Index | Abbe Number | Focal Length |
|---|---|---|---|---|---|---|
| S4 | Lens | −8.8553 | 0.0200 | | | |
| S5 | Third | 7.9540 | 0.2500 | 1.669 | 20.40 | −6.544 |
| S6 | Lens | 2.7874 | 0.4285 | | | |
| S7 | Fourth | −5179.8622 | 0.4181 | 1.669 | 20.40 | −90.150 |
| S8 | Lens | 60.9954 | 0.3429 | | | |
| S9 | Fifth | 9.7098 | 0.7008 | 1.669 | 20.40 | −50.000 |
| S10 | Lens | 7.3070 | 0.1275 | | | |
| S11 | Sixth | 1.9803 | 0.6169 | 1.537 | 55.70 | −12.785 |
| S12 | Lens | 1.3697 | 0.1817 | | | |
| S13 | Filter | Infinity | 0.1100 | 1.519 | 64.20 | |
| S14 | | Infinity | 0.1000 | | | |
| S15 | Imaging Plane | Infinity | 0.5700 | | | |

Figure 7:
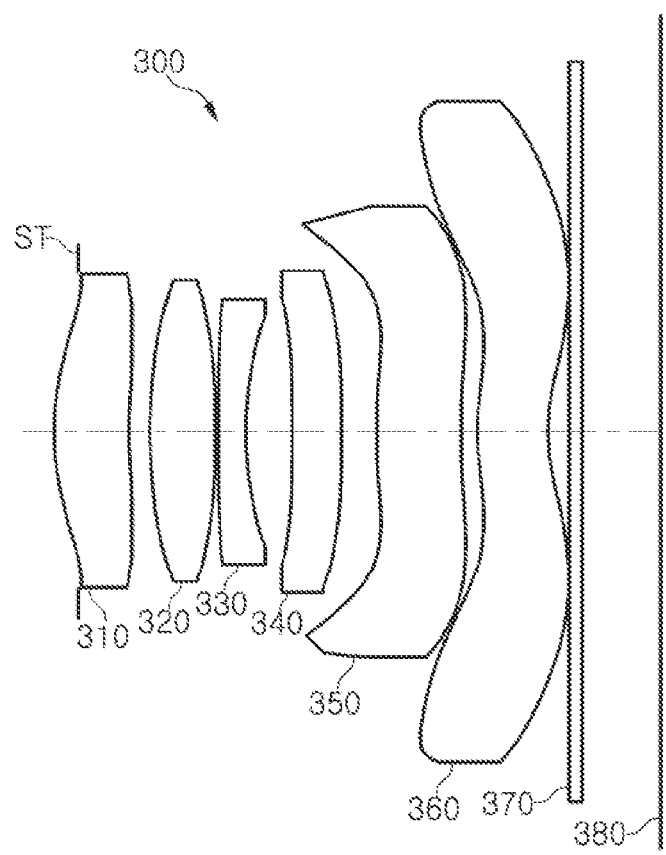
FIG. 7 is a view of an optical imaging system, according to a third example.

With reference to FIG. 7, an optical imaging system, according to a third example, will be described. An optical imaging system 300, according to the third example, includes an optical system including a first lens 310, a second lens 320, a third lens 330, a fourth lens 340, a fifth lens 350, and a sixth lens 360.

The first lens 310 has a positive refractive power. An object-side surface of lens 310 is convex and an image-side surface of lens 310 is concave. The second lens 320 has a positive refractive power. Both surfaces of lens 320 are convex. The third lens 330 has a negative refractive power. An object-side surface of lens 330 is convex and an image-side surface of lens 330 is concave.

The fourth lens 340 has a negative refractive power. Both surfaces of lens 340 may be concave. The fifth lens 350 has a negative refractive power. An object-side surface of lens 350 is convex and an image-side surface of lens 350 is concave. In addition, fifth lens 350 has an inflection point formed on an object-side surface or an image-side surface. The sixth lens 360 has a negative refractive power. An object-side surface of lens 360 is convex and an image-side surface of lens 360 is concave. In addition, sixth lens 360 has an inflection point formed on an object-side surface or an image-side surface.

The optical imaging system 300 includes a filter 370, an image sensor 380, and a stop ST. The filter 370 is disposed between the sixth lens 360 and the image sensor 380, and the stop ST is disposed in an object-side surface of the first lens 310.

Figure 8:
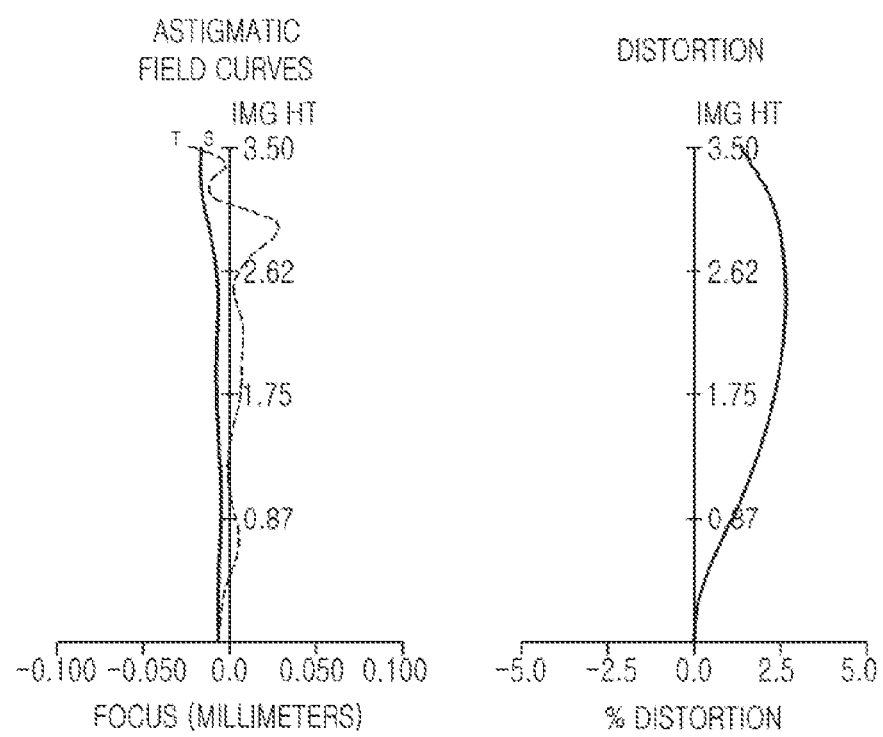
FIG. 8 is a set of graphs illustrating aberration curves of the optical imaging system illustrated in FIG. 7.

In the optical imaging system 300, f12 is 3.001 mm and f13 is 4.318 mm. The optical imaging system, configured as described above, represents aberration characteristics as illustrated by the graphs of FIG. 8, while FIG. 9 represents aspherical characteristics of the optical imaging system. Characteristics of lenses of the optical imaging system 300, according to the third example, are listed in Table 3.

TABLE 3

Third Example
F No. = 1.63 FOV = 77.6° f = 4.290 TTL = 5.222

| Surface No. | Element | Radius of Curvature | Thickness/ Distance | Refractive Index | Abbe Number | Focal Length |
|---|---|---|---|---|---|---|
| S0 | Stop | Infinity | −0.2100 | | | |
| S1 | First | 2.2740 | 0.6458 | 1.547 | 56.10 | 6.911 |
| S2 | Lens | 5.1414 | 0.1790 | | | |
| S3 | Second | 3.3935 | 0.5618 | 1.547 | 56.10 | 4.555 |
| S4 | Lens | −8.7933 | 0.0200 | | | |
| S5 | Third | 8.0928 | 0.2500 | 1.669 | 20.40 | −6.733 |
| S6 | Lens | 2.8570 | 0.3911 | | | |
| S7 | Fourth | −48.6160 | 0.4243 | 1.669 | 20.40 | −66.814 |
| S8 | Lens | 553.5900 | 0.3119 | | | |
| S9 | Fifth | 6.8191 | 0.7268 | 1.669 | 20.40 | −50.000 |
| S10 | Lens | 5.4220 | 0.1456 | | | |
| S11 | Sixth | 2.0356 | 0.6058 | 1.537 | 55.70 | −13.506 |
| S12 | Lens | 1.4242 | 0.1799 | | | |
| S13 | Filter | Infinity | 0.1100 | 1.519 | 64.20 | |
| S14 | | Infinity | 0.1000 | | | |
| S15 | Imaging Plane | Infinity | 0.5700 | | | |

Table 4 lists values of Conditional Expressions of the optical imaging systems, according to the first example to the third example.

TABLE 4

| Conditional Expression | First Example | Second Example | Third Example |
|---|---|---|---|
| f1/f | 1.7175 | 1.4727 | 1.6110 |
| f2/f | 1.0386 | 1.1079 | 1.0617 |

TABLE 4-continued

| Conditional Expression | First Example | Second Example | Third Example |
|---|---|---|---|
| f3/f | −1.5392 | −1.5044 | −1.5694 |
| f4/f | −13.8601 | −20.7241 | −15.5743 |
| f5/f | −11.8203 | −11.4943 | −11.6550 |
| f6/f | −4.2146 | −2.9391 | −3.1482 |
| V1-V2 | 0 | 0 | 0 |
| V1-V3 | 35.70 | 35.70 | 35.70 |
| V1-V5 | 35.70 | 35.70 | 35.70 |
| TTL/f | 1.2219 | 1.2022 | 1.2172 |
| TTL/f12 | 1.7314 | 1.7405 | 1.7403 |
| f13/EPD | 1.6392 | 1.6590 | 1.6358 |
| f1/f2 | 1.6537 | 1.3293 | 1.5174 |
| f2/f3 | −0.6748 | −0.7364 | −0.6765 |
| BFL/f | 0.2277 | 0.2211 | 0.2237 |
| D1/f | 0.0412 | 0.0428 | 0.0417 |
| R1/f | 0.5400 | 0.5045 | 0.5301 |
| R5/f | 1.9350 | 1.8285 | 1.8864 |
| R8/f | 24.8640 | 14.0219 | 129.0420 |

As set forth above, according to examples, an optical imaging system having high resolution may be implemented. While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples.

Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
a first lens comprising positive refractive power;
a second lens comprising positive refractive power and a convex object-side surface;
a third lens comprising a concave image-side surface;
a fourth lens comprising a refractive power;
a fifth lens comprising negative refractive power; and
a sixth lens comprising a convex object-side surface in a paraxial region,
wherein the first to sixth lenses are sequentially disposed from an object side of the optical imaging system,
wherein the optical imaging system has a total number of six lenses with refractive power,
wherein the optical imaging system satisfies TTL/f12<1.90, where TTL is a distance from an object-side surface of the first lens to an imaging plane and f12 is a composite focal length of the first lens and the second lens, and
wherein a distance from the image-side surface of the third lens to an object-side surface of the fourth lens is greater than a distance from an image-side surface of the fourth lens to an object-side surface of the fifth lens.

2. The optical imaging system of claim 1, wherein the first lens has a convex object-side surface.

3. The optical imaging system of claim 1, wherein the first lens has a concave image-side surface.

4. The optical imaging system of claim 1, wherein the third lens has a convex object-side surface.

5. The optical imaging system of claim 1, wherein the fourth lens has a concave object-side surface.

6. The optical imaging system of claim 1, wherein the sixth lens has a concave image-side surface in a paraxial region.

7. The optical imaging system of claim 1, wherein a radius of curvature of an image-side surface of the first lens is greater than a radius of curvature of an object-side surface of the second lens.

8. The optical imaging system of claim 1, wherein a radius of curvature of the image-side surface of the fourth lens is greater than a radius of curvature of the object-side surface of the fifth lens.

9. The optical imaging system of claim 1, wherein the optical imaging system satisfies 1.0<f1/f<2.0, where f is a focal length of the optical imaging system and f1 is a focal length of the first lens.

* * * * *